United States Patent
Cui et al.

(10) Patent No.: US 10,265,806 B2
(45) Date of Patent: Apr. 23, 2019

(54) SYSTEM AND METHOD FOR SEALING INTERNAL CHANNELS DEFINED IN A COMPONENT

(71) Applicant: General Electric Company, Schenectady, NY (US)

(72) Inventors: Yan Cui, Greer, SC (US); Srikanth Chandrudu Kottilingam, Greenville, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/661,360

(22) Filed: Jul. 27, 2017

(65) Prior Publication Data

US 2018/0093354 A1    Apr. 5, 2018

Related U.S. Application Data

(60) Provisional application No. 62/403,902, filed on Oct. 4, 2016.

(51) Int. Cl.
*B23K 31/02*    (2006.01)
*B23K 35/02*    (2006.01)
(Continued)

(52) U.S. Cl.
CPC ............ *B23K 35/0233* (2013.01); *B23K 1/00* (2013.01); *B23K 1/0018* (2013.01);
(Continued)

(58) Field of Classification Search
CPC .... B23K 35/0233; B23K 1/00; B23K 35/304; B23K 35/3033; B23K 1/0018; B23K 1/0008; B23K 35/0222–35/025; B23K 2101/001; F01D 9/02; F01D 25/12; F01D 5/01; F05D 2230/90; F05D 2230/237; F05D 2230/60
(Continued)

(56) References Cited

U.S. PATENT DOCUMENTS 3,392,899 A * 7/1968 Hoogstoel ................. C09J 7/20
                                                     428/624
3,636,297 A * 1/1972 Pakutka ............... B23K 1/0004
                                                     219/85.22

(Continued)

FOREIGN PATENT DOCUMENTS

DE      3 110 434 A1   10/1982
EP      2 305 412 A2    4/2011
WO   WO-2015087263 A1 * 6/2015 ........... A61N 1/3754

OTHER PUBLICATIONS

Extended European Search Report and Opinion issued in connection with corresponding EP Application No. 17194144.6 dated Feb. 6, 2018.

*Primary Examiner* — Kiley S Stoner
(74) *Attorney, Agent, or Firm* — Armstrong Teasdale LLP

(57) ABSTRACT

A system for sealing an internal passage of a component includes a closure element positioned within the internal passage, and a joint material coupling the closure element to at least one passage wall that defines the internal passage. The system also includes a flexible braze element positioned proximate the closure element, the joint material, and the at least one passage wall.

18 Claims, 3 Drawing Sheets

(51) Int. Cl.
  *B23K 1/00* (2006.01)
  *B23K 35/30* (2006.01)
  *F01D 5/18* (2006.01)
  *F01D 9/02* (2006.01)
  *F01D 25/12* (2006.01)

(52) U.S. Cl.
  CPC .......... *B23K 35/025* (2013.01); *B23K 35/304* (2013.01); *B23K 35/3033* (2013.01); *F01D 5/18* (2013.01); *F01D 9/02* (2013.01); *F01D 25/12* (2013.01); *F05D 2230/237* (2013.01); *F05D 2230/60* (2013.01); *F05D 2230/90* (2013.01)

(58) Field of Classification Search
  USPC .... 228/245–255, 56.3, 119; 29/889–889.722
  See application file for complete search history.

(56) References Cited

U.S. PATENT DOCUMENTS

| | | | |
|---|---|---|---|
| 3,952,395 A | 4/1976 | Crossman et al. | |
| 4,321,010 A * | 3/1982 | Wilkinson | B22C 9/04 416/92 |
| 4,940,566 A * | 7/1990 | Wood | B23K 35/3033 228/262.31 |
| 5,497,546 A * | 3/1996 | Kubo | H01L 21/486 219/85.13 |
| 5,511,721 A * | 4/1996 | Demo | B23K 3/087 228/119 |
| 5,666,643 A * | 9/1997 | Chesnes | B23K 35/0222 428/549 |
| 6,112,971 A | 9/2000 | Castaldo et al. | |
| 6,187,450 B1 * | 2/2001 | Budinger | B23K 35/0244 228/248.1 |
| 6,199,746 B1 * | 3/2001 | Dupree | B23P 6/005 228/119 |
| 6,276,447 B1 * | 8/2001 | Iguchi | B23K 1/0008 165/133 |
| 6,276,597 B1 * | 8/2001 | Budinger | B23K 35/0244 228/225 |
| 6,332,272 B1 * | 12/2001 | Sinnott | B23P 6/002 29/402.08 |
| 6,367,686 B1 | 4/2002 | Abriles et al. | |
| 6,454,156 B1 | 9/2002 | Taras, Jr. et al. | |
| 6,470,568 B2 * | 10/2002 | Fried | B23K 1/19 29/889.1 |
| 6,530,971 B1 * | 3/2003 | Cohen | B23K 35/0244 148/24 |
| 7,017,793 B2 | 3/2006 | Kinstler | |
| 7,303,112 B2 | 12/2007 | Ivory et al. | |
| 7,600,666 B2 * | 10/2009 | Rabinovich | B23P 6/005 228/125 |
| 7,846,261 B2 | 12/2010 | Chesnes et al. | |
| 8,595,929 B2 | 12/2013 | Manjooran et al. | |
| 9,610,451 B2 * | 4/2017 | Markham | A61N 1/3754 |
| 9,623,504 B2 | 4/2017 | Park et al. | |
| 10,006,293 B1 * | 6/2018 | Jones | F01D 5/186 |
| 10,030,802 B2 * | 7/2018 | Krauer | F16L 55/11 |
| 2001/0025417 A1 * | 10/2001 | Fried | B23K 1/19 29/889.1 |
| 2003/0034379 A1 * | 2/2003 | Jackson | B23P 6/005 228/119 |
| 2004/0050913 A1 * | 3/2004 | Philip | B23K 20/023 228/194 |
| 2004/0056079 A1 * | 3/2004 | Srinivasan | B23K 20/023 228/248.1 |
| 2005/0067466 A1 | 3/2005 | Boegli et al. | |
| 2005/0133572 A1 * | 6/2005 | Brese | B23K 3/0638 228/180.22 |
| 2008/0142575 A1 * | 6/2008 | Cretegny | B23K 35/0244 228/256 |
| 2009/0014505 A1 * | 1/2009 | Cretegny | B23K 1/0018 228/248.1 |
| 2009/0139607 A1 | 6/2009 | Kool et al. | |
| 2010/0059573 A1 * | 3/2010 | Kottilingam | B23K 1/001 228/164 |
| 2010/0187290 A1 * | 7/2010 | Holi | B23K 1/0008 228/119 |
| 2010/0270062 A1 * | 10/2010 | Casper | B23K 1/0016 174/257 |
| 2012/0111928 A1 * | 5/2012 | Park | B23K 1/0018 228/245 |
| 2014/0000266 A1 | 1/2014 | Dillard | |
| 2014/0356056 A1 * | 12/2014 | Xie | B23K 1/005 403/272 |
| 2015/0174707 A1 * | 6/2015 | Li | B23P 6/045 427/142 |
| 2015/0290747 A1 * | 10/2015 | Ozbaysal | B23K 35/3033 420/451 |
| 2015/0343574 A1 * | 12/2015 | Ozbaysal | B23P 6/045 148/528 |
| 2015/0369068 A1 * | 12/2015 | Kottilingam | B22F 7/08 415/116 |
| 2016/0363054 A1 * | 12/2016 | Miranda | F01D 5/187 |
| 2017/0072514 A1 * | 3/2017 | Ozbaysal | B23K 35/0238 |
| 2017/0100805 A1 * | 4/2017 | Daniels | C25D 3/12 |
| 2017/0259385 A1 * | 9/2017 | Baer | B23K 35/0244 |
| 2018/0179899 A1 * | 6/2018 | Garay | F01D 5/20 |

* cited by examiner

SYSTEM AND METHOD FOR SEALING INTERNAL CHANNELS DEFINED IN A COMPONENT

CROSS REFERENCE TO RELATED APPLICATIONS

This application claims priority to and the benefit of the filing date of U.S. Provisional Application No. 62/403,902 filed on Oct. 4, 2016, which is hereby incorporated by reference in its entirety.

BACKGROUND

The field of the disclosure relates generally to components having an internal passage defined therein, and more particularly to systems and methods for sealing internal channels defined in a component.

Some components require an internal passage to be defined therein, for example, in order to perform an intended function. For example, but not by way of limitation, some components, such as hot gas path components of gas turbines, are subjected to high temperatures. At least some such components have internal passages defined therein to receive a flow of a cooling fluid, such that the components are better able to withstand the high temperatures. For another example, but not by way of limitation, some components are subjected to friction at an interface with another component. At least some such components have internal passages defined therein to receive a flow of a lubricant to facilitate reducing the friction.

At least some known components having an internal passage defined therein are formed in a mold, with a core of ceramic material extending within the mold cavity. After a molten metal alloy is introduced into the mold cavity around the ceramic core and cooled to form the component, the ceramic core is removed, such as by chemical leaching, to form a preliminary internal passage. Alternatively or additionally, at least some known components having an internal passage defined therein are initially formed without the internal passage, and the internal passage is formed in a subsequent process. For example, at least some known internal passages are formed by drilling the preliminary passage into the component, such as, but not limited to, using an electrochemical drilling process.

Moreover, for at least some known components, it is necessary to form an internal closure within the preliminary internal passage in order to produce a selected final configuration of the internal passage. For example, but not by way of limitation, the preliminary internal passage as formed passes through an outer wall of the component to simplify the forming process, and the internal passage must be sealed interiorly of the outer wall to properly define the selected final configuration. Additionally or alternatively, as another non-limiting example, the internal passage is part of a network of internal passages defined within the component, and the internal closure is necessary to produce a selected flow pattern through the network of internal passages. One known method of forming such internal closures is to insert a metallic closure element within the passage at the selected closure location, and to couple the closure element to the passage walls using, for example, a braze joint to create a seal. However, for at least some such components, a small diameter of the internal passage reduces or eliminates an ability to effectively clean or remove contamination from the closure site. Occasionally, due for example to contamination, incomplete cleaning, or effects of leaching out the ceramic core at the closure site, local defects occur in the joint, resulting in an incomplete seal and an ineffective closure. Moreover, while some such defects are repairable using, for example, multiple brazing cycles, at least some such defects may be incurable through brazing, potentially resulting in an unusable component.

BRIEF DESCRIPTION

In one aspect, a system for sealing an internal passage of a component is provided. The system includes a closure element positioned within the internal passage, and a joint material coupling the closure element to at least one passage wall that defines the internal passage. The system also includes a flexible braze element positioned proximate the closure element, the joint material, and the at least one passage wall.

In another aspect, a method of sealing an internal passage of a component is provided. The method includes coupling a closure element to at least one passage wall that defines the internal passage using a joint material, and positioning a flexible braze element proximate the closure element, the joint material, and the at least one passage wall. The method also includes subjecting the component to at least one thermal cycle, such that a braze material of the flexible braze element forms a metallurgical bond with at least one of the closure element, the joint material, and the at least one passage wall.

DETAILED DESCRIPTION

The exemplary systems and methods described herein overcome at least some of the disadvantages associated with known methods of sealing an internal passage of a component. The embodiments described herein include a closure element securely coupled within the internal passage by a joint material, such as braze. The joint material may define a defect that prevents complete sealing of the passage. The embodiments described herein further include a flexible braze element positioned proximate the closure element and a passage wall adjacent the joint material. The flexible braze element fitted over the joint material facilitates improved positioning of a desired quantity of braze material over the joint material, and thus improved metallurgical bonding and sealing at the joint.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
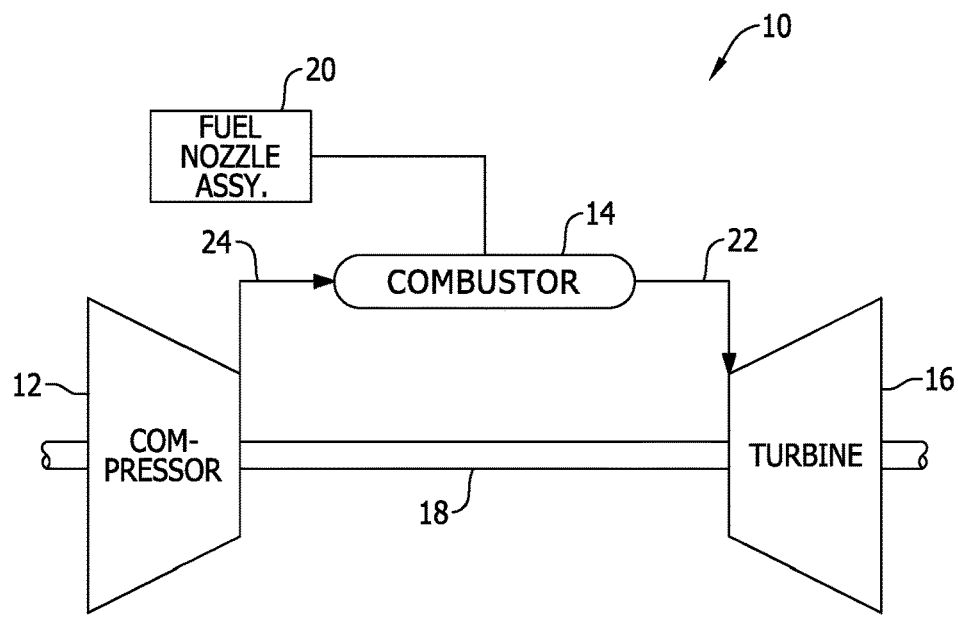
FIG. 1 is a schematic view of an exemplary gas turbine.

FIG. 1 is a schematic view of a rotary machine, i.e., a turbomachine, and more specifically, a turbine engine. In the exemplary embodiment, the turbine engine is a gas turbine engine 10. Alternatively, the rotary machine is any other turbine engine and/or rotary machine, including, without limitation, a steam turbine engine, a centrifugal compressor, and a turbocharger. In the exemplary embodiment, gas turbine engine 10 includes at least one of each of a compressor 12, a combustor 14, a turbine 16, and a fuel nozzle 20. Fuel nozzle 20 is configured to inject and mix fuel (not shown) with pressurized air 24 in combustor 14. Combustor 14 ignites and combusts the fuel-air mixture (not shown) and then passes a hot gas flow 22 into turbine 16. Turbine 16 includes one or more stators having fixed vanes or blades (not shown in FIG. 1), and one or more rotors having blades or buckets (not shown in FIG. 1) that rotate relative to the stators. Hot gas flow 22 passes over the turbine rotor blades, thereby driving the turbine rotor to rotate. Turbine 16 is coupled to a single rotatable shaft 18 such that it rotates the shaft as hot gas flow 22 passes over the turbine blades. It should be noted that, as used herein, the term "couple" is not limited to a direct mechanical, electrical, and/or communication connection between components, but may also include an indirect mechanical, electrical, and/or communication connection between multiple components. In alternative embodiments, rotatable shaft 18 is a plurality of shaft segments coupled together to form rotatable shaft 18. In the exemplary embodiment, rotatable shaft 18 is coupled to compressor 12. Compressor 12 includes blades (not shown) rigidly mounted to a rotor (not shown) that is driven to rotate by rotatable shaft 18. As air passes over the rotating blades, air pressure increases, thereby providing combustor 14 with sufficient pressurized air 24 for proper combustion.

Figure 2:
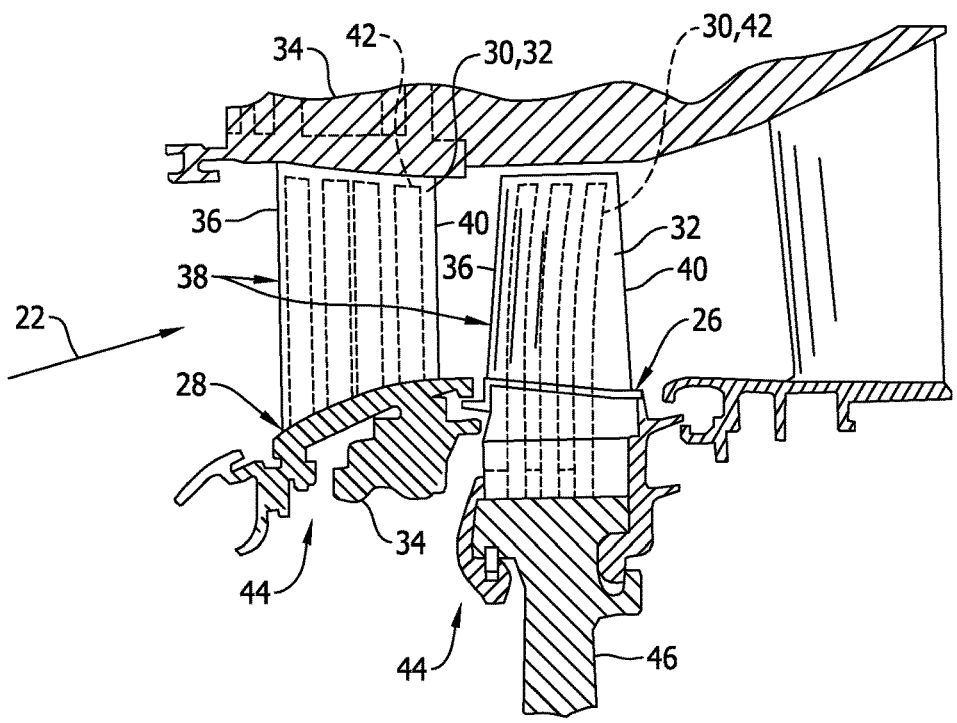
FIG. 2 is a schematic view of a portion of a turbine of the gas turbine engine shown in FIG. 1.

FIG. 2 is a schematic view of a portion of turbine 16 of gas turbine engine 10 shown in FIG. 1. Components of gas turbine engine 10 suitably formed with an internal passage defined therein are designated as components 38. For example, but not by way of limitation, components 38 include components proximate a path of hot gas flow 22. Such hot gas path components are subjected to high temperatures during operation of gas turbine engine 10, e.g., the hot gas flow 22 operating temperature, in one example, is above 2500 degrees Fahrenheit (° F.) (~1371 degrees Celsius (° C.)). Additionally or alternatively, components 38 include any component suitably formed with an internal passage defined therein. In particular, although components 38 are illustrated in the context of gas turbine engine 10, it should be understood that the systems and methods described herein are applicable to components for use in any suitable context that utilizes components suitably formed with an internal passage defined therein.

In the exemplary embodiment, gas turbine engine 10 includes a cooling system 42 to cool component 38. For example, in the exemplary embodiment, turbine 16 includes at least one turbine blade 26 and at least one stator vane 28, and component 38 is at least one of turbine blade 26 and stator vane 28. In alternative embodiments, component 38 includes, without limitation, any of other turbine bucket assemblies (also known as blades or blade assemblies), other nozzle assemblies (also known as vanes or vane assemblies), shroud assemblies, transition pieces, retaining rings, and compressor exhaust components. In general, cooling system 42 includes a plurality of internal passages 30 defined within component 38. In the exemplary embodiment, a cooling fluid, e.g., pressurized air 24, is provided to internal passages 30 from a plenum, and the cooling fluid flows through each of the internal passages 30, cooling component 38. In alternative embodiments, a fluid other than pressurized air 24 may be used to cool components exposed to hot gas flow 22. It should also be appreciated that the term "fluid" as used herein includes any medium or material that flows, including, but not limited to gas, steam, and air. In the exemplary embodiment, at least one cooling system 42 is defined in each component 38 and is coupled in flow communication with a cooling fluid supply conduit 44 formed in a casing 34 of gas turbine engine 10. In the exemplary embodiment, cooling fluid supply conduit 44 is fluidly coupled to compressor 12.

Figure 3:
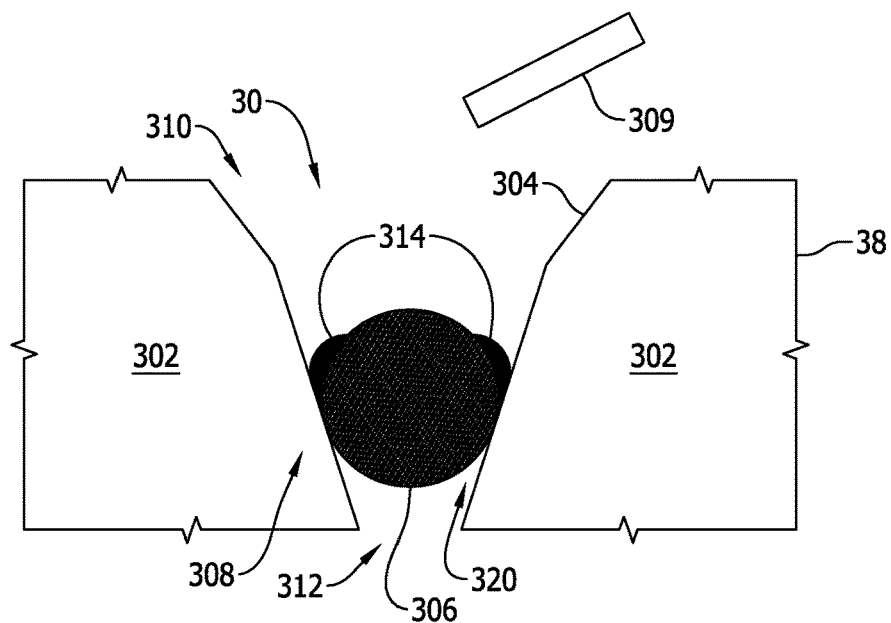
FIG. 3 is a schematic section view of a portion of an exemplary component, such as a component for use with the gas turbine shown in FIG. 1.

FIG. 3 is a schematic section view of a portion of an exemplary embodiment of component 38, such as for use with gas turbine engine 10 (shown in FIG. 1). In the exemplary embodiment, component 38 is formed from a substrate 302. In certain embodiments, substrate 302 is formed from a high strength superalloy metal, such as, but without limitation, at least one of a nickel-based superalloy, a cobalt-based superalloy, an iron-based superalloy, a nickel-aluminum intermetallic alloy, a titanium-aluminum-based intermetallic compound, a niobium-based alloy, and a molybdenum-based alloy. In alternative embodiments, substrate 302 is formed from any suitable material that enables component 38 to function as described herein.

As described above, internal passage 30 is defined within component 38. More specifically, internal passage 30 is defined by at least one passage wall 304 that extends interiorly through at least a portion of substrate 302. In certain embodiments, a coating (not shown) is present on the at least one passage wall 304. For example, but not by way of limitation, an aluminide coating (not shown) is formed on an exposed surface of substrate 302 along the at least one passage wall 304. In alternative embodiments, any suitable coating, or no coating, is present on the at least one passage wall 304.

A closure element 306 is coupled within internal passage 30 proximate a closure site 308. More specifically, closure element 306 is sized and shaped to be received against the at least one passage wall 304 proximate closure site 308. For example, in the exemplary embodiment, the at least one passage wall 304 defines a generally circular cross-section of internal passage 30 proximate closure site 308, and closure element 306 is generally ball-shaped and has a diameter approximately equal to a diameter of internal passage 30 proximate closure site 308. In alternative embodiments, each of internal passage 30 and closure element 306 has any suitable shape that enables closure element 306 to function as described herein.

In the exemplary embodiment, closure element 306 is formed from a material that is suitable for use in high-temperature and/or corrosive environments. For example, but not by way of limitation, closure element 306 is formed from a Hastelloy® material. Hastelloy is a registered trademark of Haynes International, Inc. of Kokomo, Ind. In alternative embodiments, closure element 306 is formed from any suitable material, or combination of materials, that enables closure element 306 to function as described herein.

In certain embodiments, the at least one passage wall 304 is shaped to facilitate positioning closure element 306 proximate closure site 308. For example, closure element 306 is insertable through internal passage 30 to closure site 308, such that closure element 306 is received in an interference fit proximate closure site 308. More specifically, in the exemplary embodiment, a shape of the at least one passage wall 304 on a first side 310 of closure site 308 is configured to enable insertion of closure element 306 through internal passage 30, and a shape of the at least one passage wall 304 on an opposite second side 312 is configured to couple against closure element 306 in an interference fit. In alternative embodiments, the at least one passage wall 304 is shaped in any other suitable fashion to facilitate positioning closure element 306 proximate closure site 308. Additionally or alternatively, removable tooling 309 is used to initially position closure element 306 proximate closure site 308.

In addition, closure element 306 is securely coupled to the at least one passage wall 304 by a joint material 314. In the exemplary embodiment, joint material 314 is a braze material. A braze material is a material that has a lower melting point than a melting point of substrate 302 and closure element 306, and provides a substantial match with other select chemical properties of substrate 302 and closure element 306, such that relatively reduced chemical activity occurs between the braze material and substrate 302 and closure element 306. For example, before, after, and/or simultaneously with, positioning closure element 306 proximate closure site 308, joint material 314 is applied as a paste to at least one of closure element 306 and the at least one passage wall 304, and the assembly is then heated in a suitable brazing cycle such that joint material 314 metallurgically bonds with closure element 306 and the at least one passage wall 304.

For example, but not by way of limitation, substrate 302 is formed from a nickel alloy, and joint material 314 is formed at least partially from a nickel brazing alloy. In a particular embodiment, substrate 302 is formed from a nickel alloy, and joint material 314 includes Amdry DF4B, which is a nickel brazing alloy. In alternative embodiments, joint material 314 is any suitable material that enables closure element 306 to function as described herein.

In the exemplary embodiment, a defect 320 is defined by joint material 314 and is in fluid communication with first side 310 and second side 312 of internal passage 30. For example, but not by way of limitation, defect 320 forms as a result of contamination, incomplete cleaning, or effects of leaching out a ceramic core proximate closure site 308, as described above. Because defect 320 places first side 310 and second side 312 in fluid communication with each other, defect 320 inhibits closure element 306 from providing an effective closure or seal of internal passage 30 at closure site 308. In alternative embodiments, no defect 320 is present.

Figure 4:
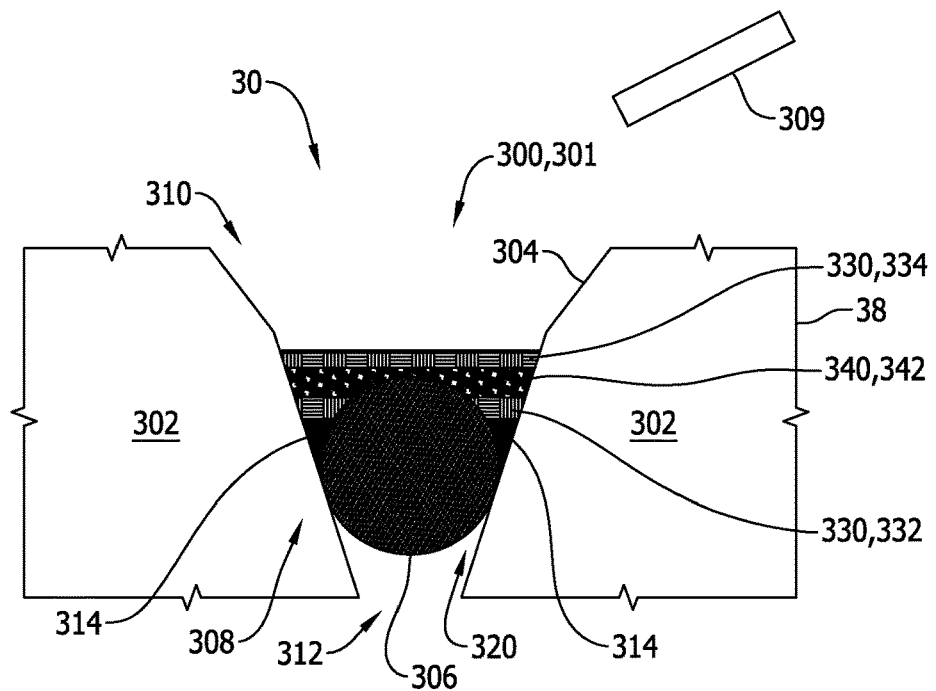
FIG. 4 is a schematic section view of the portion of the exemplary component shown in FIG. 3, having an exemplary embodiment of a sealing system coupled within an internal passage thereof in an application configuration.
Figure 5:
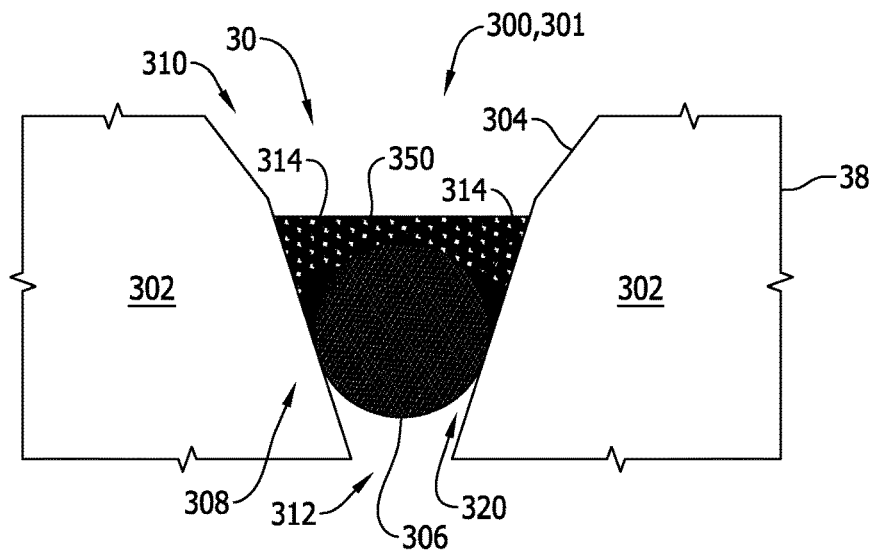
FIG. 5 is a schematic section view of the portion of the exemplary component shown in FIG. 3, having the exemplary sealing system shown in FIG. 4 coupled within the internal passage thereof in a finished configuration.

FIG. 4 is a schematic section view of the portion of exemplary component 38 shown in FIG. 3, having an exemplary embodiment of a sealing system 300 coupled within internal passage 30 in an application configuration 301. FIG. 5 is a schematic section view of the portion of the exemplary component 38 shown in FIG. 3, having exemplary sealing system 300 coupled within internal passage 30 in a finished configuration 303.

With reference to FIGS. 4 and 5, in addition to closure element 306 and joint material 314, system 300 in application configuration 301 further includes, within internal passage 30, at least one flexible braze element 340 positioned proximate closure element 306, joint material 314, and the at least one passage wall 304. For example, in the exemplary embodiment, the at least one flexible braze element 340 is positioned adjacent closure site 308 on first side 310 of closure element 306. In alternative embodiments, the at least one flexible braze element 340 is positioned adjacent closure site 308 on second side 312 of closure element 306.

System 300 in finished configuration 303 is obtained from system 300 in application configuration 301 by subjecting system 300 to at least one thermal cycle. More specifically, an elevated temperature of system 300 during the at least one thermal cycle causes flexible braze element 340 to transform into a sealing element 350 adjacent closure element 306. The at least one thermal cycle causes a braze material of flexible braze element 340 to form metallurgical bonds with at least one of closure element 306, joint material 314, and the at least one passage wall 304 to form sealing element 350 over at least joint material 314, including over defect 320, if present, on first side 310 of internal passage 30. Thus, system 300 facilitates sealing internal passage 30 proximate closure site 308, such that first side 310 is no longer in flow communication with second side 312, even in the presence of defect 320 in joint material 314.

In the exemplary embodiment, the at least one thermal cycle is selected to be a suitable brazing cycle for the braze material of flexible braze element 340. In alternative embodiments, the at least one thermal cycle is selected to be any suitable thermal cycle that enables system 300 to function as described herein.

Flexible braze element 340 is a solid material that is flexible at ambient temperatures, such as but not limited to a flexible tape, such that flexible braze element 340 is moldable to at least partially fit within a valley-shaped space defined between closure element 306 and the at least one passage wall 304 adjacent joint material 314. Moreover, an initial solidity of flexible braze element 340 simplifies application of flexible braze element 340 adjacent an entirety of an outer surface of joint material 314 on first side 310, and facilitates maintaining flexible braze element 340 in position over the entirety of the outer surface of joint material 314 on first side 310 during the at least one thermal cycle, as compared to application of a braze paste alone over joint material 314. Thus, as compared to a use of a braze paste alone, flexible braze element 340 facilitates improved metallurgical bonding between the braze material within flexible braze element 340 and at least one of substrate 302, closure element 306, and joint material 314, and, therefore, facilitates complete obstruction of internal passage 30 in finished configuration 303.

In certain embodiments, flexible braze element 340 is applied to using tool 309 inserted from first side 310, such that flexible braze element 340 is fit at least partially within the space defined between closure element 306 and the at least one passage wall 304 adjacent joint material 314. For example, tool 309 is used to push flexible braze element 340 tightly into the space defined between closure element 306 and the at least one passage wall 304 adjacent joint material 314. Additionally or alternatively, vacuum pressure is used to position flexible braze element 340 at least partially within the space defined between closure element 306 and the at least one passage wall 304 adjacent joint material 314. In alternative embodiments, flexible braze element 340 is positioned in any suitable fashion that enables system 300 to function as described herein.

In certain embodiments, flexible braze element 340 is a flexible tape formed from a suitably compatible mixture of a powdered low-melt braze material, a powdered high-melt material, and a suitable binder. For example, the binder is selected to "burn off" during the at least one thermal cycle. In certain embodiments, substrate 302 is formed from a nickel alloy, joint material 314 is formed from a mixture that includes a nickel brazing alloy, and flexible braze element 340 is a flexible tape formed from a mixture of a powdered low-melt nickel brazing alloy, a powdered high-melt nickel alloy, and a suitable binder. For example, flexible braze element 340 is a flexible tape that includes DF4B, as the low-melt braze material, and MarM 247, as the high-melt material, in a ratio within a range of from about 70:30 to about 30:70. In one such example, flexible braze element 340 includes DF4B and MarM 247 in a ratio of about 50:50. In alternative examples, flexible braze element 340 includes DF4B and MarM 247 in any suitable ratio that enables flexible braze element 340 to function as described herein. For another example, flexible braze element 340 is a flexible tape that includes, as the high-melt material, at least one of Rene 142, Rene 195, and Rene 80. For another example, flexible braze element 340 is a flexible tape that includes, as the low-melt braze material, at least one of AMS 4782, AMS 4777, Amdry DF-3, and Amdry D-15. In alternative embodiments, flexible braze element 340 is formed from any suitable materials, in any suitable fashion, that enables flexible braze element 340 to function as described herein.

In certain embodiments, flexible braze element 340 has a thickness within a range of about 0.020 inches to about 0.180 inches. In a particular embodiment, flexible braze element 340 has a thickness of about 0.060 inches. In alternative embodiments, flexible braze element 340 has any suitable thickness that enables flexible braze element 340 to function as described herein. Moreover, in certain embodiments, flexible braze element 340 is positionable at locations within internal passage 30 at which it would be difficult or impossible to position a similar thickness of braze material as a paste or as a rigid braze piece, such as a pre-sintered preform, accurately over an entirety of joint material 314.

In certain embodiments, system 300 in application configuration 301 further includes, within internal passage 30, a braze paste 330 adjacent flexible braze element 340 within internal passage 30. In the exemplary embodiment, braze paste 330 is selected to be compatible with at least one of substrate 302, closure element 306, joint material 314, and flexible braze element 340. For example, but not by way of limitation, substrate 302 is formed from a nickel alloy, joint material 314 includes DF4B, flexible braze element 340 is a tape that includes DF4B and MarM 247 in a 50:50 ratio, and braze paste 330 also includes DF4B. In certain embodiments, braze paste 330 applied in combination with flexible braze element 340 in application configuration 301 enhances a metallurgical bonding among sealing element 350, substrate 302, closure element 306, and joint material 314 in finished configuration 303, for example by providing additional brazing material proximate closure site 308 during the at least one thermal cycle.

In certain embodiments, braze paste 330 and the at least one flexible braze element 340 are disposed sequentially in layers proximate closure element 306 to form application configuration 301. For example, in the exemplary embodiment, after closure element 306 is secured within internal passage 30 by joint material 314 as described above, alternating layers of braze paste 330 and flexible braze element 340 are applied sequentially adjacent closure element 306 within internal passage 30. In the exemplary embodiment, braze paste 330 in application configuration 301 includes a first paste layer 332 and a second paste layer 334, and the at least one flexible braze element 340 includes a first flexible braze element 342 disposed intermediate first paste layer 332 and second paste layer 334. In particular, first paste layer 332 is disposed on closure element 306, first flexible braze element 342 is disposed on first paste layer 332 opposite closure element 306, and second paste layer 334 is disposed on first flexible braze element 342 opposite first paste layer 332. For example, but not by way of limitation, application of first paste layer 332 prior to application of first flexible braze element 342 enables the braze material within first paste layer 332 to be pushed tightly within the space defined between closure element 306 and the at least one passage wall 304 adjacent joint material 314 as flexible braze element 340 is molded to at least partially fit within the space defined between closure element 306 and the at least one passage wall 304 adjacent joint material 314. In alternative embodiments, each of braze paste 330 and the at least one flexible braze element 340 includes any suitable number of layers, applied in any suitable sequence, that enables system 300 to function as described herein.

In other alternative embodiments, each of braze paste 330 and the at least one flexible braze element 340 is applied in any suitable fashion, such as but not limited to applying braze paste 330 and flexible braze element 340 at least partially simultaneously and/or having braze paste 330 at least partially pre-coated on flexible braze element 340, that enables system 300 to function as described herein.

It should be understood that, in certain embodiments, formation and bonding of sealing element 350 is facilitated by suitable cleaning and decontamination procedures proximate closure site 308 prior to applying braze paste 330 and the at least one flexible braze element 340. For example, but not by way of limitation, mechanical cleaning along a 0.25-inch length of internal passage 30 extending from closure element 306 along first side 310 is performed prior to applying braze paste 330 and the at least one flexible braze element 340.

Figure 6:
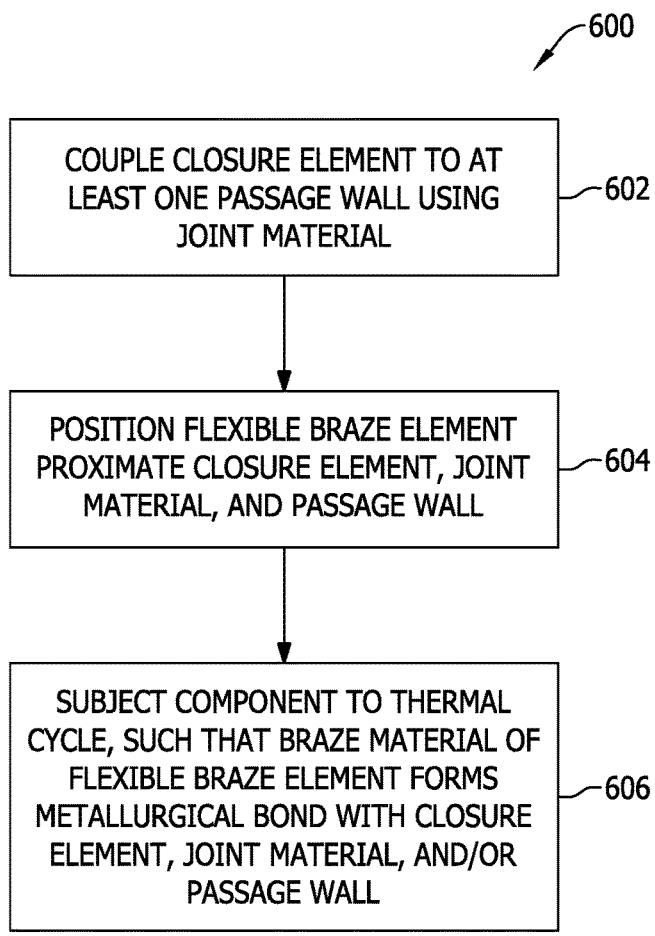
FIG. 6 is a flow diagram of an exemplary method of sealing an internal passage of a component, such as the component shown in FIGS. 3-5.

FIG. 6 is a flow diagram of an exemplary method 600 of sealing an internal passage of a component, such as component 38. For example, but not by way of limitation, component 38 is a component of gas turbine engine 10. Alternatively, component 38 is for use in any suitable context that utilizes components suitably formed with an internal passage defined therein. With reference also to FIGS. 1-5, exemplary method 600 includes coupling 602 a closure element, such as closure element 306, to at least one passage wall, such as passage wall 304, that defines the internal passage, such as internal passage 30, using a joint material, such as joint material 314. Method 600 also includes positioning 604 a flexible braze element, such as flexible braze element 340, proximate the closure element, the joint material, and the at least one passage wall. Method 600 further includes subjecting 606 the component to at least one thermal cycle, such that a braze material of the flexible braze element forms a metallurgical bond with at least one of the closure element, the joint material, and the at least one passage wall.

Exemplary embodiments of a system and method for sealing an internal passage of a component are described above in detail. The embodiments provide an advantage over at least some known systems for sealing such passages, in that sealing the passage is accomplished even in the presence of a flow-through defect in the joint material, such as braze, used to couple a closure element within the passage. Thus, internal sealing of such passages is possible even in cases where a limited space surrounding the closure site inhibits cleaning of the site prior to forming the initial joint.

In addition, the use of the flexible braze element enables the seal to be accomplished in cases where additional brazing cycles using braze paste alone have failed to achieve a seal. Thus, the embodiments described above enable use of components that would formerly have been scrapped. Certain embodiments also provide an advantage in that the flexible braze element used to complete the seal is formed from a powdered low-melt braze material and a powdered high-melt material combined with a suitable binder to form a flexible tape, facilitating accurate positioning of the braze material and/or a selected precision tuning of the braze material.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A system for sealing an internal passage of a component, said system comprising:
    a closure element positioned within the internal passage;
    a joint material coupling said closure element to at least one passage wall that defines the internal passage;
    a flexible braze element positioned proximate said closure element, said joint material, and the at least one passage wall; and
    a braze paste adjacent said flexible braze element within the internal passage.

2. The system of claim 1, wherein said flexible braze element comprises a solid material that is flexible at ambient temperatures.

3. The system of claim 1, wherein said flexible braze element comprises a flexible tape.

4. The system of claim 3, wherein said flexible tape comprises a mixture of a powdered low-melt braze material, a powdered high-melt material, and a binder.

5. The system of claim 3, wherein said flexible tape comprises a mixture of a low-melt nickel brazing alloy and a high-melt nickel brazing alloy in a ratio within a range of from about 70:30 to about 30:70.

6. The system of claim 1, wherein said braze paste and said flexible braze element are disposed sequentially in layers proximate said closure element.

7. The system of claim 6, wherein said layers comprise a first paste layer disposed on said closure element, said flexible braze element as a first flexible braze element disposed on said first paste layer, and a second paste layer disposed on said first flexible braze element.

8. The system of claim 1, wherein said braze paste comprises a low-melt nickel brazing alloy.

9. The system of claim 1, wherein said closure element is sized and shaped to be received against the at least one passage wall in an interference fit proximate a closure site of the internal passage.

10. A method of sealing an internal passage of a component, said method comprising:
    coupling a closure element to at least one passage wall that defines the internal passage using a joint material;
    positioning a flexible braze element proximate the closure element, the joint material, and the at least one passage wall;
    positioning a braze paste adjacent the flexible braze element within the internal passage; and
    subjecting the component to at least one thermal cycle, such that a braze material of the flexible braze element forms a metallurgical bond with at least one of the closure element, the joint material, and the at least one passage wall.

11. The method of claim 10, wherein positioning the flexible braze element comprises molding the flexible braze element into a space defined between the closure element and the at least one passage wall adjacent the joint material.

12. The method of claim 11, wherein molding the flexible braze element comprises at least one of pushing the at least one flexible braze element into the space using a tool, and applying vacuum pressure to position the flexible braze element within the space.

13. The method of claim 10, further comprising applying the braze paste and the flexible braze element sequentially in layers proximate the closure element.

14. The method of claim 13, wherein applying the braze paste and the flexible braze element sequentially in layers comprises applying a first paste layer on the closure element, applying the flexible braze element as a first flexible braze element on the first paste layer, and applying a second paste layer on the first flexible braze element.

15. The method of claim 10, further comprising applying the braze paste and the flexible braze element at least partially simultaneously.

16. The method of claim 10, further comprising inserting the closure element through a first side of the internal passage, such that the closure element is received in an interference fit proximate a closure site within the internal passage.

17. The method of claim 10, wherein positioning the flexible braze element comprises positioning a flexible tape.

18. The method of claim 17, wherein positioning the flexible tape comprises positioning the flexible tape formed from a mixture of a powdered low-melt braze material, a powdered high-melt material, and a binder.

* * * * *